US007475665B2

(12) United States Patent
Ketelhohn et al.

(10) Patent No.: US 7,475,665 B2
(45) Date of Patent: Jan. 13, 2009

(54) CAPACITANCE-BASED FLUID LEVEL SENSOR (75) Inventors: Charlie Ketelhohn, Cedarburg, WI (US); Robert Zimprich, Milwaukee, WI (US); Pat Griesemer, Franklin, WI (US)

(73) Assignee: Wacker Neuson Corporation, Menomonee Falls, WI (US)

( * ) Notice: Subject to any disclaimer, the term of this patent is extended or adjusted under 35 U.S.C. 154(b) by 0 days.

(21) Appl. No.: 11/623,138

(22) Filed: Jan. 15, 2007

(65) Prior Publication Data
US 2007/0163534 A1 Jul. 19, 2007

Related U.S. Application Data (60) Provisional application No. 60/743,134, filed on Jan. 17, 2006.

(51) Int. Cl.
F01M 11/10 (2006.01)
G01F 23/00 (2006.01)
B60Q 1/00 (2006.01)

(52) U.S. Cl. ............................... 123/196 S; 123/198 D; 73/304 C; 340/450.3

(58) Field of Classification Search .............. 123/196 S, 123/198 D, 198 DB, 198 DC; 73/304 C, 73/304 R; 340/450.3
See application file for complete search history.

(56) References Cited

U.S. PATENT DOCUMENTS

| 3,614,730 | A |   | 10/1971 | Bozoian |          |
|-----------|---|---|---------|---------|----------|
| 4,194,395 | A |   | 3/1980  | Wood    |          |
| 4,648,364 | A | * | 3/1987  | Wills ................. | 123/198 D |
| 4,745,893 | A | * | 5/1988  | Atherton et al. ........ | 123/196 S |
| 4,782,698 | A | * | 11/1988 | Wilson ................. | 73/304 C |
| 4,806,847 | A | * | 2/1989  | Atherton et al. ........ | 73/304 C |
| 5,052,223 | A | * | 10/1991 | Regnault et al. ....... | 73/304 C |
| 5,117,218 | A | * | 5/1992  | Sasaki et al. .......... | 340/450.3 |
| 5,390,762 | A | * | 2/1995  | Nelson ................ | 123/196 S |
| 5,687,687 | A | * | 11/1997 | Trueblood et al. ...... | 123/196 S |
| 5,861,811 | A | * | 1/1999  | Lease et al. ........... | 73/304 C |
| 5,907,278 | A | * | 5/1999  | Park et al. ............. | 123/196 S |
| 6,237,412 | B1 |  | 5/2001  | Morimoto |          |
| 6,275,048 | B1 | * | 8/2001 | Milli ................. | 324/690 |
| 6,443,006 | B1 | * | 9/2002 | Degrave ............. | 73/304 C |

(Continued)

FOREIGN PATENT DOCUMENTS

EP          1462775 A      9/2004

(Continued)

Primary Examiner—Noah Kamen
(74) Attorney, Agent, or Firm—Boyle Fredrickson S.C.

(57) ABSTRACT

A fluid level sensor comprises a parallel plate capacitor coupled to an integrated circuit located in the bottom of an oil pan or other receptacle in which fluid level is being sensed. The sensor is preferably mounted on a drain plug for the receptacle. It includes an integrated circuit board encapsulated in a potting material disposed within the drain plug and a probe extending upwardly from the integrated circuit with its lower end also encapsulated with a resin such that its leads are protected by the resin encapsulating the integrated circuit. The probe may include one or more slotted plates in which capacitance bridges are formed within the slots or a plurality of parallel plates in which capacitance bridges are formed between adjacent plates. The sensor can be used to control operation of a gauge and/or an ignition control circuit for the machine's engine.

26 Claims, 5 Drawing Sheets

U.S. PATENT DOCUMENTS

| | | | |
|---|---|---|---|
| 6,539,797 B2 * | 4/2003 | Livingston et al. | 73/304 C |
| 6,701,784 B1 | 3/2004 | Mutusek | |
| 6,791,334 B2 * | 9/2004 | Horie et al. | 324/438 |
| 6,857,313 B2 * | 2/2005 | Williamson | 73/304 C |
| 7,064,560 B2 * | 6/2006 | Yamamoto et al. | 73/304 C |
| 7,114,391 B2 * | 10/2006 | Sasaki et al. | 73/304 C |
| 2003/0233875 A1 * | 12/2003 | Stehman et al. | 73/304 C |

FOREIGN PATENT DOCUMENTS

| | | |
|---|---|---|
| GB | 792484 A | 3/1958 |
| GB | 795189 A | 5/1958 |

* cited by examiner

CAPACITANCE-BASED FLUID LEVEL SENSOR

CROSS-REFERENCE TO RELATED APPLICATION(S)

This application claims priority from U.S. Provisional Patent Application Ser. No. 60/743,134 filed on Jan. 17, 2006, the entire contents of each of which is hereby expressly incorporated by reference into the present application.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The invention relates to fluid level sensors and, more particularly, relates to a sensor for sensing the level of oil or another fluid in a receptacle based on changes of capacitance between parallel plates of a parallel plate capacitor. The sensor is particularly well-suited for use in machines that are subject to severe vibrations or otherwise are not amenable to float-type fluid level sensors.

2. Discussion of the Related Art

Fluid level sensors are widely used for sensing the level of fluids in receptacles in industrial and automotive applications. For instance, such sensors are typically used for monitoring the level of fuel in a fuel tank or the level of oil in an oil pan. These sensors typically comprise float-type sensors that include a buoyant float. The float simply rises and falls with the level of fluid in the receptacle and transmits an appropriate signal when the fluid level drops below a designated value.

Some applications, however, are ill-suited for float-type sensors. For instance, some machines are subject to severe vibrations or dramatic changes in orientation in use, resulting in significant agitation of the fluid within the monitored space as well as jostling of the float. These events result in reduced reliability or even complete inoperability of a float-type fluid level sensor. Examples of machines having these characteristics include rammers, breakers, and hammers.

Electronic fluid level sensors have been proposed and even implemented that lack the disadvantages of float-type sensors, but prior known electronic fluid level sensors have problems of their own. For instance, so-called tube-type capacitance fluid level sensors are known that are inserted downwardly into an upper opening in a crankcase such as an existing dipstick opening or a custom opening positioned much as a dipstick opening would be. The sensor includes inner and outer conductive tubes forming a capacitance bridge therebetween. Changes in fluid level within the receptacle are detected by changes in capacitance between the tubes, permitting the generation of a low fluid level warning signal or the like when the fluid level between the tubes drops below a designated value.

The need has therefore arisen for providing a simple, reliable, fluid level sensor.

SUMMARY OF THE INVENTION

In accordance with an aspect of the invention, a fluid level sensor takes the form of a parallel plate capacitor coupled to an integrated circuit located in the bottom of an oil pan or other receptacle in which fluid level is being sensed. The sensor is preferably located in a drain plug for the receptacle. It includes an integrated circuit board encapsulated in a potting material disposed within the drain plug and a probe extending upwardly from the integrated circuit board with its lower end also encapsulated in the potting material.

Two embodiments are disclosed herein. In the first embodiment, the probe includes at least one dielectric plate having a number of vertically extending slots formed therein. The plate may be formed from an extension of the integrated circuit board. The opposed edges of the slots are formed from a conductive material, such as aluminum, such that each slot forms a parallel plate capacitor with a capacitance bridge being formed between the facing conductive edges of the slot. In the second embodiment, the probe takes the form of a plurality of parallel plates. In this case, a capacitance bridge is formed between each set of adjacent plates. In both embodiments, fluid level variations within the capacitance bridges change the capacitance of the probe, which can be translated into a signal indicative of the level of fluid being monitored.

The probe is particularly well-suited for sensing the level of fluid in a tank or other receptacle of a machine that is subject to severe vibrations in use, hence prohibiting the use of a float-type sensor. These machines include rammers, breakers, and hammers.

Controls are also disclosed for controlling the rammer or other controlled machine based on signals from the sensor. For instance, the sensor can be configured to operate only during initial start up and/or prevent continued running of the machine if the sensed oil level is below a designated value.

A method of sensing fluid levels is also disclosed.

Other objects, features, and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Two embodiments of fluid level sensors constructed in accordance with the present invention will now be described in the form of oil level sensors for use in a rammer. It should be understood, however, that many different embodiments of the invention are also contemplated, and are usable as fluid level sensors in many other applications.

Referring now to the drawings and initially to FIGS. 1-4, a rammer (sometimes known as a tamper) 20 is illustrated that includes an engine 22 and a rammer subassembly 24 bolted to one another to form an integral unit. The rammer subassembly 24 includes a rammer crankcase 26 and a reciprocating tamping shoe 28 connected to the rammer crankcase 26 by a reciprocating piston (not shown) so as to oscillate or reciprocate vertically upon rammer operation. The piston is protected at its lower end by a fixed guard 30 and at its upper end by a flexible boot 32 that accommodates movement of the shoe 28 relative to the rammer crankcase 26. The machine is supported and guided by an operator's handle 34 that also serves as a guard.

Figure 1:
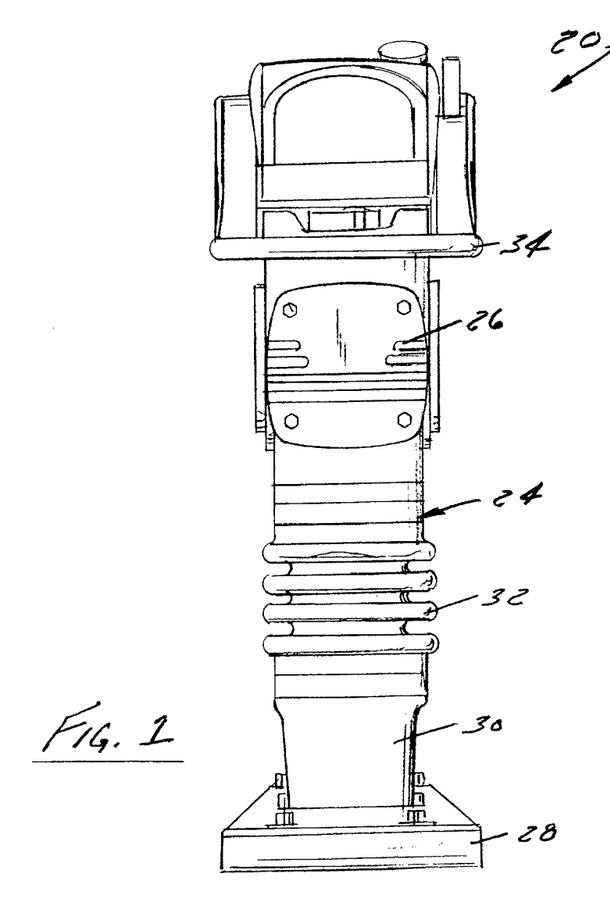
FIGS. 1 and 2 are front and side elevation views, respectively, of a rammer incorporating an oil level sensor constructed in accordance with a first preferred embodiment of the present invention.
Figure 2:
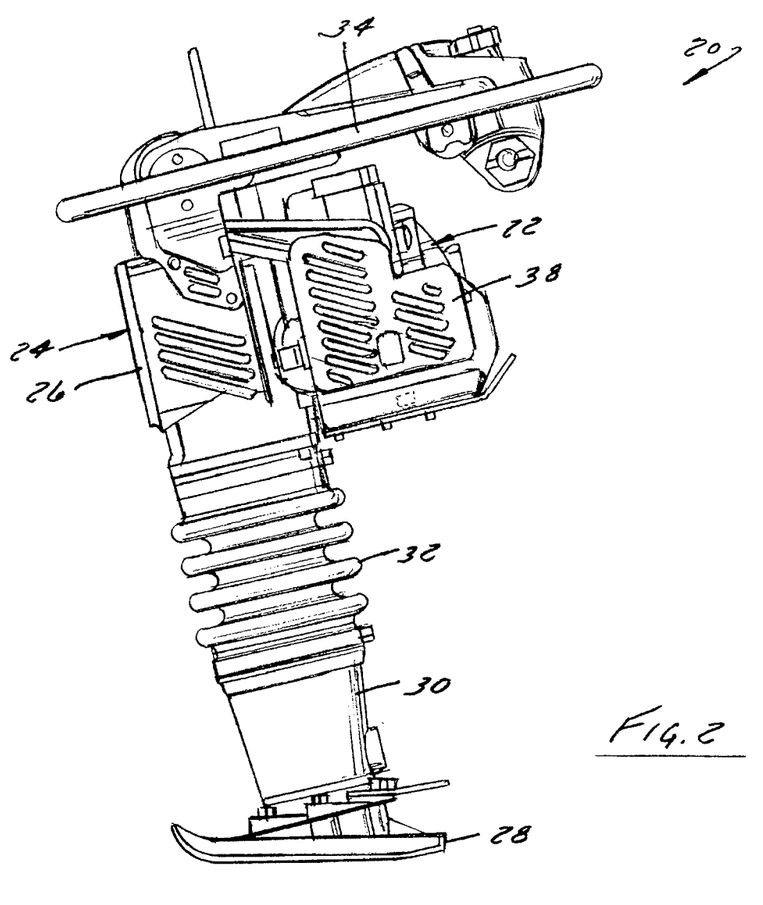
Figure 3:
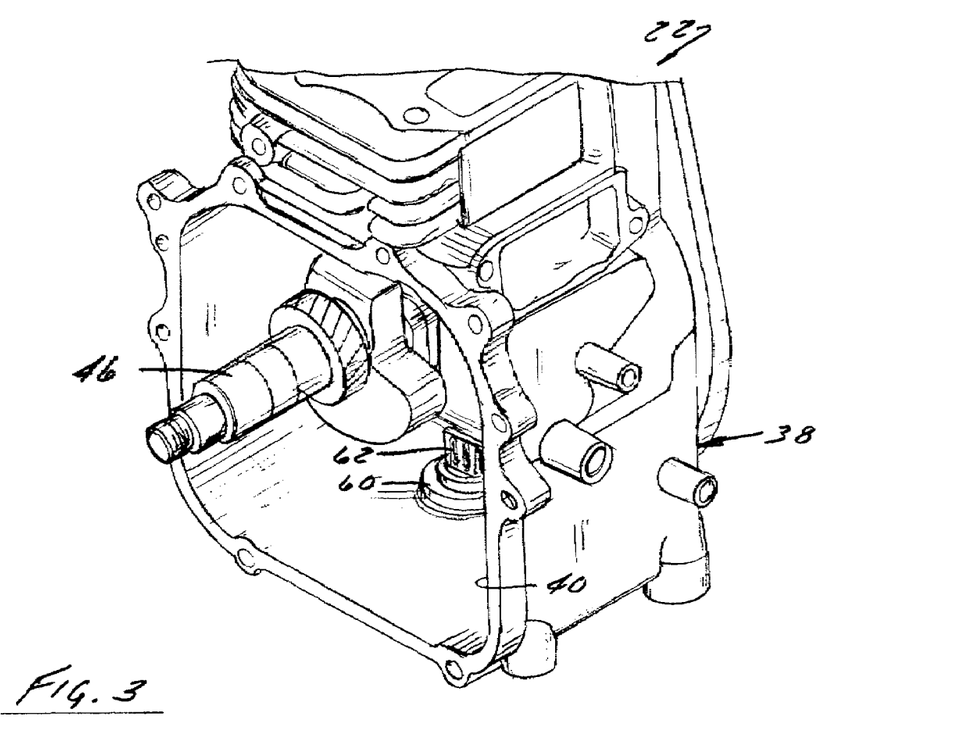
FIG. 3 is a perspective view of a crankcase of the rammer of FIGS. 1 and 2, shown open so as to reveal the oil level sensor disposed therein.
Figure 4:
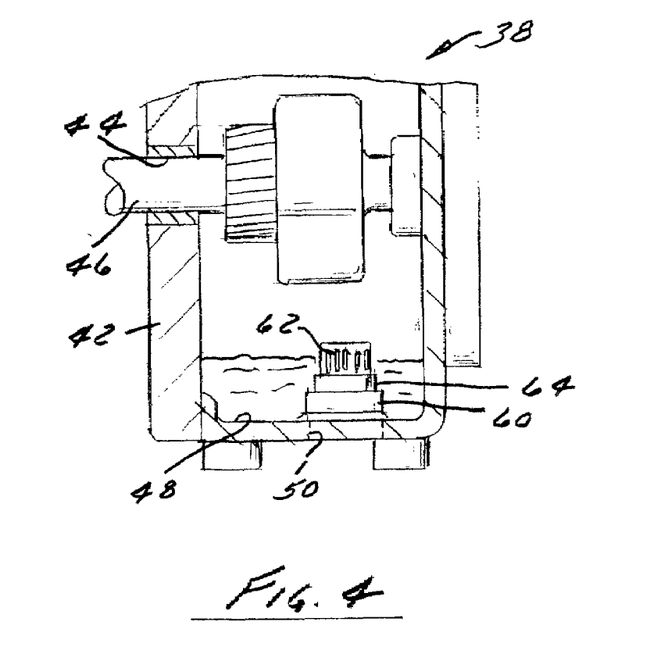
FIG. 4 is a side sectional view of a crankcase of FIG. 3.

Still referring to FIGS. 1-4, the engine 22 is a spark ignited, single-cylinder, four-stroke internal combustion engine. The cylinder (not shown) is encased in a crankcase 38 bolted to a rear surface of the rammer crankcase 26. The engine 22 is started via a pull-cord (not shown) mounted, for example, on the rear surface of the engine crankcase 38. Referring to FIGS. 3 and 4, the crankcase 38 includes an integrated oil pan 40 in its bottom portion. The crankcase 38 has a removable front cover 42 having an opening 44 through which an output shaft 46 of the engine 22 extends. An opening 50 is formed in the bottom 48 of the oil pan 40 for receiving a drain plug 60. The drain plug 60 may be any device that is selectively insertable into and removable from the opening 50 in the bottom 48 of the bottom of the oil pan 40 for draining oil from the oil pan 40. The drain plug 60 of the illustrated embodiment is threaded, but a clip-type or other drain plug could be used as well. A portion of the drain plug 60, extending into the oil pan 40, forms a hollow plastic cylindrical sensor housing 64. The housing 64 of this embodiment also extends beneath the exterior surface of the crankcase 38.

Figures 5, 6, 7, 8, 9:
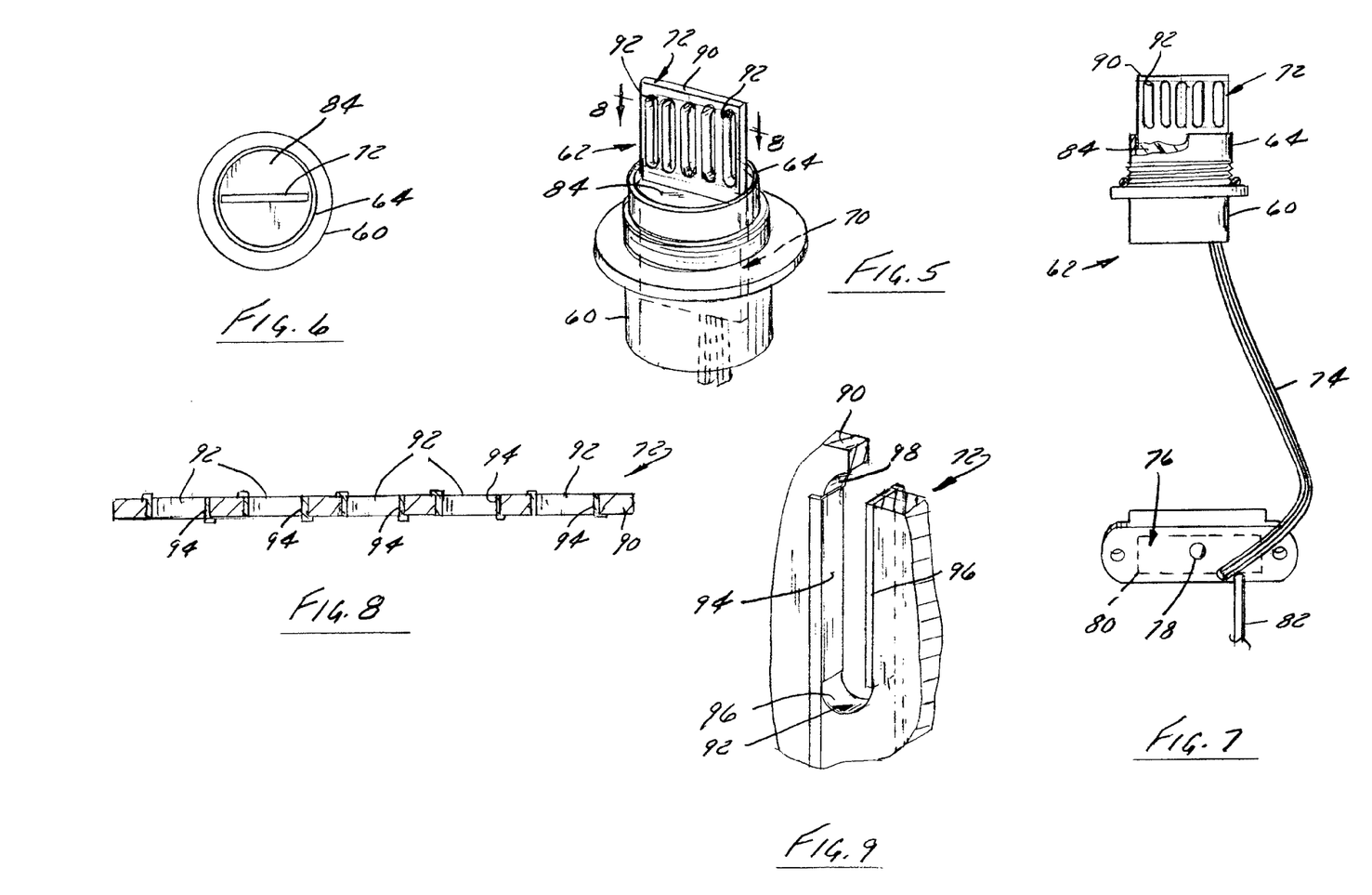
FIGS. 5 and 6 are perspective and top plan views, respectively, of the oil level sensor of FIGS. 3 and 4.
FIG. 7 is a partially cutaway side elevation view of the oil level sensor of FIGS. 5 and 6.
FIG. 8 is a sectional view of the oil level sensor of FIGS. 5-7, shown along the lines 8-8 in FIG. 6.
FIG. 9 is an enlarged fragmentary view of a portion of the oil level sensor of FIGS. 5-8.
Figure 10:
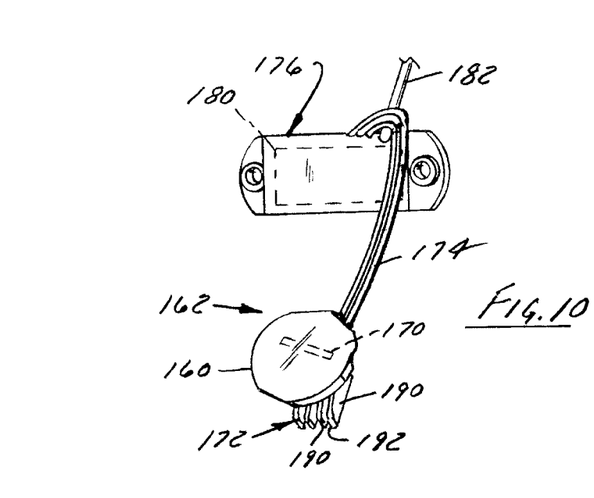
FIG. 10 is a perspective view of an oil level sensor usable on the rammer of FIGS. 1-4 and constructed in accordance with a second preferred embodiment of the present invention.
Figure 11:
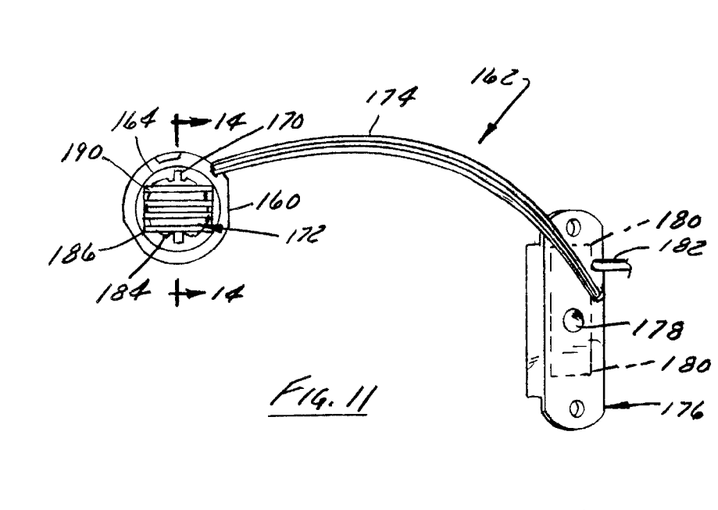
FIGS. 11, 12, and 13 are top elevation, bottom elevation, and side elevation views, respectively of the oil level sensor of FIG. 10.
Figure 12:
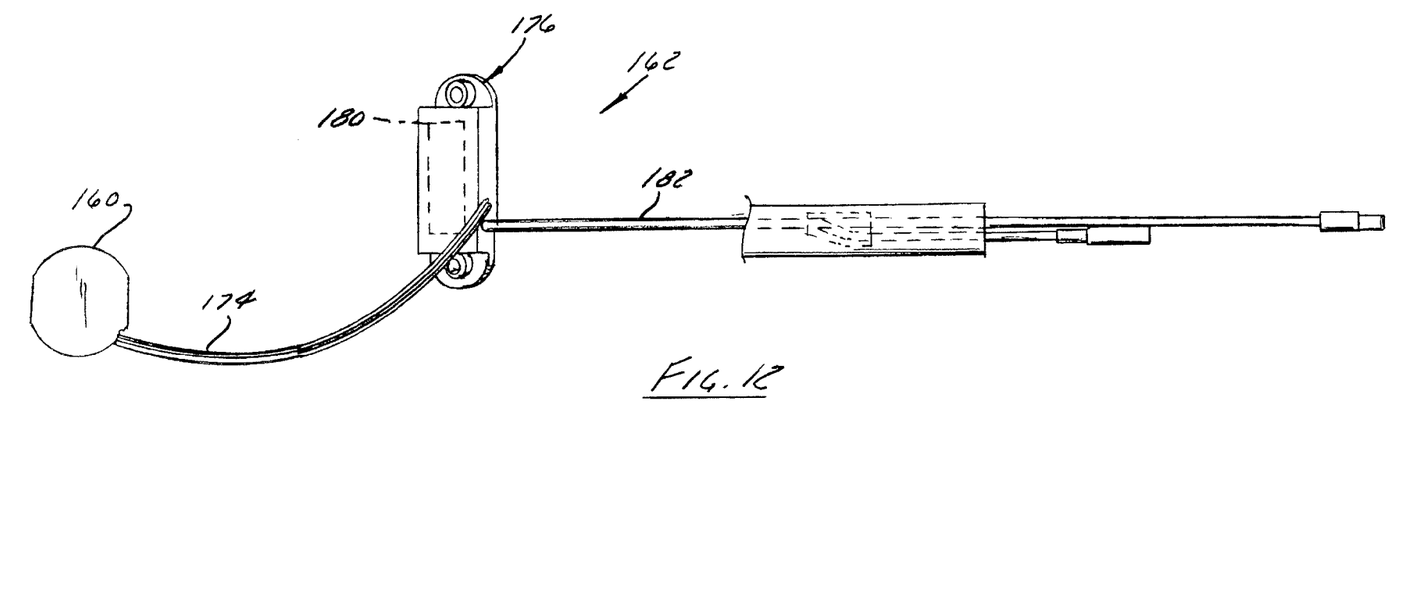
Figure 13:
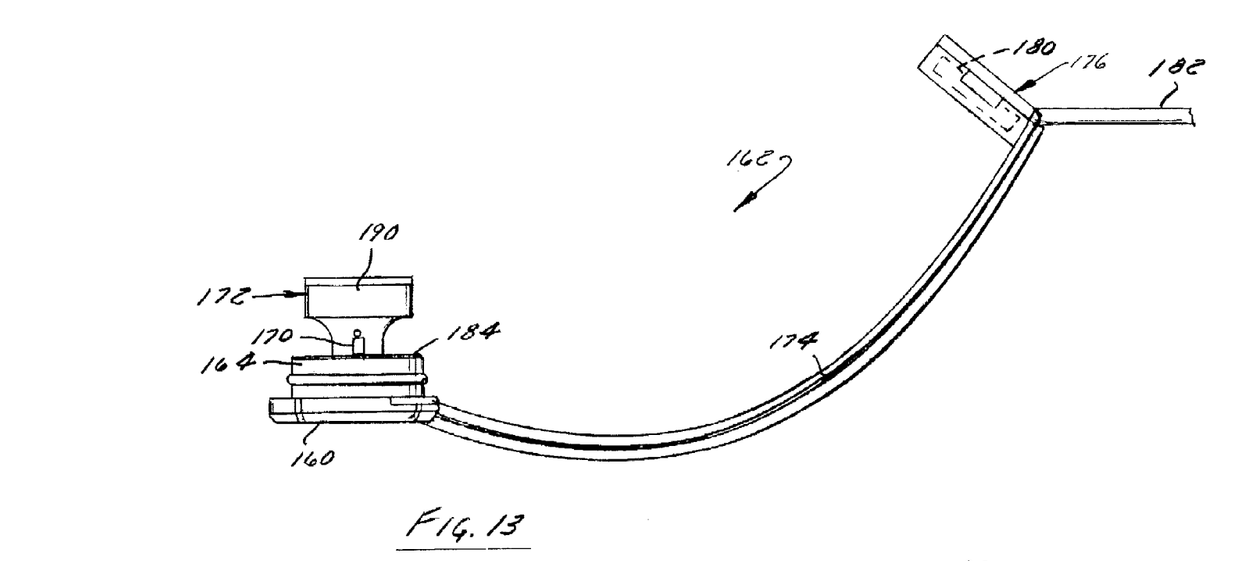
Figure 14:
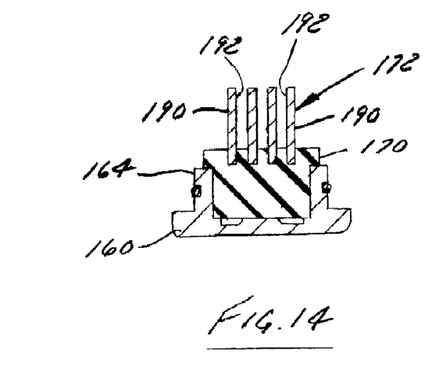
FIG. 14 is a sectional side elevation view of a portion of the oil level sensor of FIGS. 10-13, taken along the lines of 14-14 in FIG. 10.

Referring to FIGS. 5-9, a parallel plate capacitor-type fluid level sensor 62 constructed in accordance with a first embodiment of the invention is supported in the housing 64. The sensor 62 includes an integrated circuit board 70, a probe 72, several leads 74, and a remote gauge 76. The gauge 76 is mounted on the rear of the rammer 20 in the vicinity of the rammer's other indicators and controls. Referring to FIG. 7, gauge 76 preferably includes an LED 78 or other indicator that provides a visual indication of a low oil condition, such as a flashing red light. It may also have an internal controller 80, such as an LED integrated circuit board, that coordinates operation of the motor's ignition system and the sensor 62. An additional lead 82 extends from the gauge 76 to the rammer's ignition system. That lead supplies power to the sensor 62 and gauge 76 and may also control the ignition system.

The integrated circuit board 70 of the sensor 62 contains the necessary electronics for receiving signals from the probe 72, manipulating those signals to generate signals indicative of fluid level, and transmitting those signals to the gauge 76. The integrated circuit board 70 is held in place within the housing 64 by being encapsulated in a nonconductive, insulating potting material 84. Potting material 84 also protects the integrated circuit board 70 from oil in the tank and electrically isolates the integrated circuit board 70 from the interior of the oil pan 40.

Still referring to FIGS. 5-8, the probe 72 of this embodiment includes a single slotted dielectric plate 90 extending upwardly from the drain plug 60. The plate 90 of this embodiment is formed as an extension of the integrated circuit board 70, hence eliminating the need for secondary soldering operations or other connections coupling the two boards together. This integration facilitates production and increases the reliability of the sensor. Hence, while the terms "circuit board" and "probe" are used separately herein to denote two conceptually different elements, they are in fact integrated into the same board in this embodiment. However, the probe plate 90 could be formed from a second circuit board that is electrically and possibly even physically connected to upper end of the integrated circuit board 70. Other slotted plates could be provided as well.

Still referring to FIGS. 5-9, the plate 90 is encapsulated in the potting material 84 at its bottom end and extends upwardly into the interior of the oil pan 40 as seen in FIGS. 3 and 4. A number of parallel vertical slots 92 are formed in the plate 90. The side edges 94 of the slots are coated with a conductive material, such as aluminum or another metal. This coating may be achieved, for example, by plating the entire perimeters of the slots 92 with a conductive layer and then routing the upper and lower ends 94 of the slots 92 to remove the conductive layer from the upper and lower ends 96 of the slots 94 and, thus, form the separate parallel plates on the opposite sides of each slot 92. A capacitance bridge is therefore formed between the conductive edges of each slot 92. The resulting structure is seen in FIG. 9.

The leads 74 extend from the bottom of the integrated circuit board 70 to the gauge 76. They include a ground lead, a supply lead or ignition wire providing electrical power to the circuit board 70 and probe 72, and a signal wire transmitting fluid level signals to the gauge 76 from the integrated circuit board 70.

A second embodiment of the invention, usable in place of the sensor 62 and in other applications as well, is illustrated in FIGS. 10-14 at 162. The sensor 162 of this embodiment, like the sensor 62 of the first embodiment, includes an integrated circuit board 170, a probe 172, and a gauge 176. The integrated circuit board 170 and probe 172 are mounted in a plastic cylindrical housing 164 formed in a portion of a drain plug 160 that extends upwardly into the oil pan 40 is use. The integrated circuit board 170 is held in place within the housing 164 and is protected from the environment by being encapsulated in a suitable potting material 184 such as an encapsulating resin. Leads 174, including a ground lead, signal lead, and power supply lead or ignition wire also extend out of the housing 164 to the gauge 176. Also as in the first embodiment, the gauge 176 may include an LED 178 or other indicator(s). It may also have an internal controller 180 that is coupled to the integrated circuit board 170 by the leads 174 and to the engine's ignition circuit by an ignition wire 182. As in the first embodiment, the ignition wire 182 also supplies power to the sensor 162 via the ignition wire lead.

The sensor 162 of the second embodiment differs from the sensor 62 of the first embodiment primarily in that the capacitance bridges of the probe 172 are formed not by spacings within slots of a slotted plate but by gaps 192 formed between adjacent parallel plates 190. The plates 190 are formed from circuit boards that extend perpendicular to the integrated circuit board 170 and that are mounted in slots formed in the top of the integrated circuit board 170. The outer surfaces of the plates 190 are sufficiently conductive to create capacitance bridges in the gaps 192 between the parallel plates 190. Four plates 190 are provided in the illustrated embodiment, creating three capacitance bridges. Each plate 190 is approximately 0.06" thick by 0.9" long by 0.2" to 0.25" high. The gaps 192 between the plates 190 are each approximately 0.1" thick. While the probe 172 of this embodiment is structurally more complicated in construction than that of the first embodiment and requires the use of multiple circuit boards, it has the advantage of being able to generate considerably stronger capacitance fields in the bridges between the parallel plates then may be generated within the slots of the single slotted single plate capacitor of the first embodiment.

In use, changes in oil level within the oil pan 40 alter the frequency of the capacitance field in the capacitance bridges formed in the slots 92 of the probe 72 of the first embodiment or in the gaps 192 between the plates 190 of the probe 172 of the second embodiment. As the oil level drops, the frequency increases. An increase in frequency above a designated level, such as would occur when the oil level in the pan 40 drops below the bottom of the slots 92 in the first embodiments or below the bottoms of the plates 190 in the second embodiment, would indicate an unacceptably low oil level within the oil pan 40. For example, the probe 172 of the second embodiment could be configured such that its oscillation period increases from approximately 600 microseconds at a low oil condition in which the plates 190 are completely exposed to about 700 microseconds at a "full" level condition in which the oil level approaches the tops of or covers the plates 190. Generating a warning signal only when the fluid levels drop beneath the bottom of parallel plates negates the need to "tune" or precisely calibrate the capacitors for a given unit.

The rammer 20 may respond to the signals from either sensor 62 or sensor 162 in the same manner. The response to signal sensor 162 of the second embodiment will now be described, it being understood that the description is equally applicable to the sensor 62 of the first embodiment.

The controller 180 in the gauge 176 is preferably configured to generate a low oil signal only when the sensor's oscillation period is below a frequency that is indicative of the absence of any oil in the capacitance bridges between the plates 190. Hence, in the second embodiment, the low oil warning signal is generated only when the level in the oil pan 40 is below the bottom of the plates 190. The sensor 162 in effect therefore senses the presence or absence of oil between the plates 190 as opposed to a level of oil between the plates 190. This approach significantly increases the reliability of the sensor 162 and facilitates its design when compared to an approach that attempts to determine the level of oil between the plates 190 because it does not require any sophisticated calibration of the sensor 162 to account for changes in oil properties or temperature.

In the illustrated example of a rammer, or in any other environment in which vibrations or other factors may lead to severe "sloshing" or other transitory changes of fluid level in the monitored receptacle, the controller 180 coordinates operation of the engine's ignition system and the LED warning light 178 such that the warning light 178 is illuminated only at or immediately after engine start up when the fluid level in the pan 40 is at least generally stable. Signals from the sensor 162 are thereafter not generated or are ignored. Otherwise, false low oil warning signals could be generated during operation of the machine.

Low fluid level signals could also be used to prevent the engine 22 from operating for more than a short period of time after start up, hence preventing the engine 22 from being damaged from inadequate lubrication. For instance, the low oil level signal could be transmitted from the controller 180 to a snubbing circuit that electrically snubs (i.e., shunts to electrical ground) the electrical pulses to the engine's ignition coil. However, it is preferred that this signal not be sent until the engine has run for a period of time, e.g., 30 seconds, with the warning light 178 illuminated, so that the operator may be apprised of the reason for engine shut down.

Other features and characteristics of the preferred embodiment are discernable from the materials collectively attached as Appendix A. These materials include a production specification sheet and a Drawing No. 164344 referenced in that sheet.

We claim:

1. A low fluid level warning sensor comprising:
   (A) a single parallel plate capacitor-based probe located only in a bottom portion of a fluid receptacle; and
   (B) a controller that receives signals from the probe and that generates capacitance-dependent signals indicative of a fluid level in the receptacle, wherein a frequency of a capacitance field of the probe varies with fluid levels in the receptacle, the controller generates a low fluid level warning signal in response to only sensed variations of capacitance field frequency, and wherein the sensor is incapable of detecting any fluid level other than one triggering a low fluid level warning signal.

2. The sensor of claim 1, wherein the capacitor is formed from at least one slotted plate.

3. The sensor of claim 1, wherein the controller includes an integrated circuit board connected to the probe to form a single unit, and wherein the unit is mounted in the receptacle.

4. The sensor of claim 3, wherein the integrated circuit board and the probe are mounted on a drain plug.

5. The sensor of claim 3, wherein the integrated circuit board is encapsulated in a potting material into which is embedded a base of the probe.

6. The sensor of claim 1, wherein the controller generates a low fluid warning level only if the fluid level in the receptacle drops below a bottom of parallel plates of the probe.

7. A low fluid level detection system including a sensor mounted in a bottom portion of a receptacle and comprising:
   (A) a fluid level sensor comprising
      i. a parallel plate capacitor-based probe located in a bottom portion of a fluid receptacle wherein each plate of the probe extends a common distance from the bottom portion of the fluid receptacle, and
      ii. a controller that receives signals from the probe and that generates frequency and capacitance-dependent signals indicative of a fluid level in the receptacle; and
   (B) a low fluid level warning gauge that receives signals from the controller and that displays a low fluid level warning signal, wherein
      the system is incapable of detecting any fluid level other than one triggering a low fluid level warning signal.

8. The system of claim 7, wherein the capacitor of the probe is formed from at least one slotted plate.

9. The system of claim 7, wherein the capacitor of the probe is formed from a plurality of parallel plates.

10. The system of claim 7, wherein the controller includes an integrated circuit board connected to the probe to form a single unit, and wherein the unit is mounted in the receptacle.

11. The system of claim 7, wherein the integrated circuit board is encapsulated in a potting material into which is embedded a base of the probe.

12. The system of claim 7, wherein the frequency of a capacitance field of the probe varies with fluid levels in the receptacle and the controller generates a low fluid level warning signal associated with the unacceptable fluid level in response to sensed variations of capacitance field frequency.

13. The system of claim 12, wherein the controller generates the low fluid warning signal only if the fluid level in the receptacle drops below a bottom of parallel plates of the probe.

14. The system of claim 7, wherein the gauge includes a second controller that is connected to an ignition system of an engine.

15. The system of claim 14, wherein the second controller prevents the engine from running upon detection of a low fluid level condition by the controller of the sensor.

16. The system of claim 14, wherein the second controller is non-responsive to signals from the sensor after a designated period of time following engine startup.

17. A machine including the system of claim 7.

18. A rammer including the system of claim 7.

19. A method comprising:
sensing fluid levels in a receptacle using a sensor including a parallel plate-type probe located in the receptacle; and
generating a low fluid warning level only if the fluid level in the receptacle drops below the parallel plates located in the receptacle only during an initial start-up period, and wherein the sensor is incapable of detecting any fluid level other than triggering a low fluid level warning signal.

20. The method of claim 19, wherein a frequency of a capacitance field of the probe varies with fluid levels in the receptacle, and further comprising generating the controller a low fluid level warning signal in response to sensed variations of capacitance field frequency.

21. The method of claim 19, further comprising controlling operation of at least one of a gauge and an ignition system for an engine based on the sensing step.

22. The method of claim 21, further comprising preventing the engine from running upon detection of a low fluid level condition.

23. The method of claim 21, wherein the sensing step is performed by a sensor including a parallel plate capacitor further comprising disregarding or disabling signals from the sensor after a designated period of time following engine startup.

24. A method comprising:
(A) connecting a parallel plate capacitor probe to a printed circuit board, the capacitor having a capacitance field having a frequency which varies with fluid levels thereacross;
(B) encapsulating the printed circuit board in a potting material to form a unit;
(C) mounting the unit in a drain hole of an oil pan monitoring or to form a sensor so that a low fluid level warning signal output is generated only if the frequency exceeds a threshold value, and wherein the frequency threshold value is exceeded only if an oil level in the oil pan drops below a level indicative of a low oil condition.

25. A low fluid level warning sensor comprising:
(A) a parallel plate capacitor-based probe located in a bottom portion of a fluid receptacle;
(B) a controller that receives signals from the probe and that generates capacitance-dependent warning signals indicative of a low fluid level in the receptacle based on a frequency of the fluid and a thresh-hold frequency,
wherein the capacitor is formed from at least one slotted plate, and wherein the sensor is incapable of detecting any fluid level other than one triggering a low fluid level warning signal.

26. A low fluid level warning sensor comprising:
(A) a parallel plate capacitor-based probe located in a fluid receptacle and positioned such that all of the plates of the parallel plate capacitor-based probe extend upwardly from a bottom surface of the fluid receptacle; and
(B) a controller that receives signals from the probe and that generates frequency based capacitance-dependent warning signal indicative of a low fluid level in the receptacle only when the fluid level is below a lowest point of the plates, and wherein the sensor is incapable of detecting any fluid level other than one triggering the low fluid level warning signal.

* * * * *